May 6, 1930. P. J. MARTIN 1,757,777
CLEANING DEVICE
Filed April 3, 1928
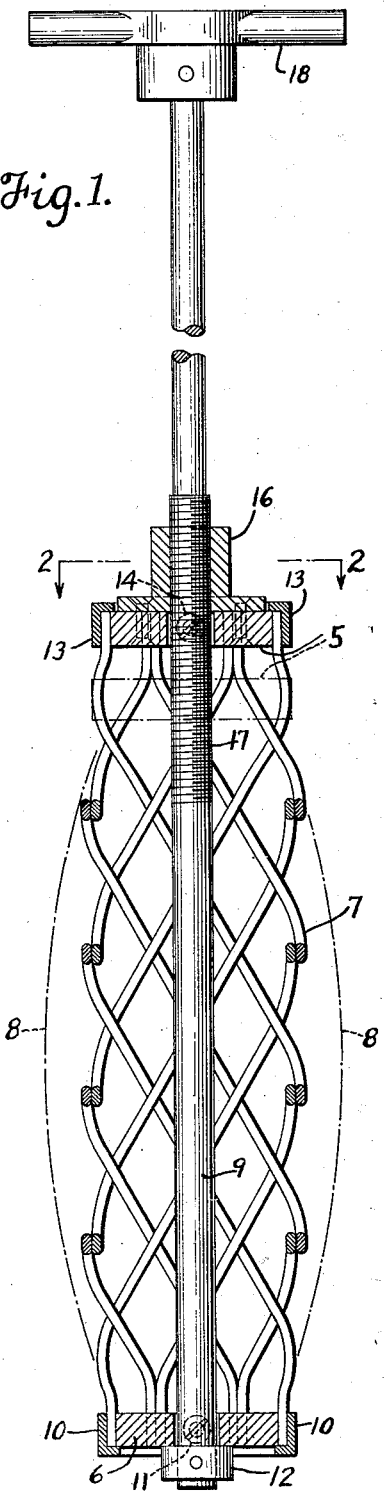
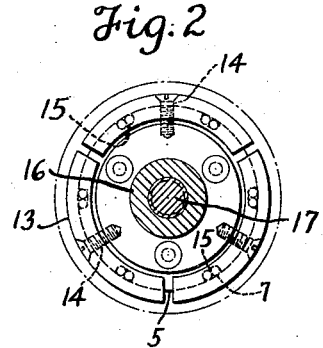
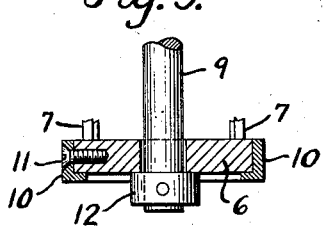
INVENTOR
Philip J. Martin
BY
ATTORNEY Patented May 6, 1930

1,757,777

UNITED STATES PATENT OFFICE

PHILIP J. MARTIN, OF ELIZABETH, NEW JERSEY

CLEANING DEVICE

Application filed April 3, 1928. Serial No. 266,973.

The invention relates to a cleaning device for cleaning or scraping the interior of tubes or pipes of varying diameters and has for its object to produce a device of this description which will be economical to manufacture and efficient in use.

The device comprises a pair of heads between which are carried a plurality of strands of wire or wire cord woven into an open mesh, cylindrically shaped. As the heads are moved toward one another, after being inserted in the tube to be cleaned, the mesh will bulge outward and bear against the interior of the tube or pipe. This action is caused by the change of form of the meshes. The meshes which are substantially identical in shape, as they are contracted, when the heads are drawn together, will be shortened axially and widened circumferentially, thus increasing the diameter of the cleaner and causing it to be forced with considerable pressure against the interior walls to be cleaned.

Other advantages and improvements will be brought out in the following specification. Referring to the drawings forming a part thereof and in which one embodiment of the invention is illustrated;

Fig. 1 is a longitudinal sectional view of my improved cleaner;

Fig. 2 is a cross sectional view taken on the line 2—2 of Fig. 1; and

Fig. 3 is a fragmentary detail sectional view of one head and its associated parts, the section being taken in a different plane than that of Fig. 1.

Referring again to the drawings the reference numerals 5 and 6 designate the heads to which the mesh 7 is suitably secured. The mesh 7, as previously stated, is composed of wires or wire rope of substantial resiliency. It will be noted that all the meshes of the member 7 are substantially identical in size. As the heads are moved toward each other or when the head 5 assumes the broken line position indicated in Fig. 1, the meshes are shortened axially and widened or increased circumferentially. This will cause the member 7 to bulge outwardly as indicated by the broken lines 8, thus causing the member 7 to engage the interior of the tube or pipe to be cleaned and efficiently remove all dirt or accretions therefrom. Obviously if the head 5 were moved closer to the head 6 the bulge of the member 7 would be increased proportionately.

The head 6 is swiveled or pivotally mounted on a rod 9 and has a number of notches into which the ends of the wires of the mesh 7 are slipped. The wires are held in place by arcuate clamping members 10 secured in the head 6 by screws 11. The clamping members 10 are angle shaped in cross section, the screws 11 passing through the leg adjacent the periphery of the head and the other leg acting to prevent the wires from protruding when the heads are drawn toward each other. The rod 9 passes through a clearance hole in the head 6 and has a collar 12 secured to its outer end. Numerous ways might be devised to secure the mesh 7 to the head 6.

The opposite end of the mesh 7 is secured to the head 5 in a similar way to that which is employed in securing it to the head 6. Similar arcuate clamping members 13 secured to the head 5 by screws 14 firmly hold the ends of the wires in the notches 15 in the head. From the foregoing it may be readily observed that when the mesh 7 becomes worn it may easily be removed and a new one substituted. As in the case of the head 6 the means by which the mesh is secured to the head 5 may be widely varied, the essential feature being that the mesh is secured to the heads so that it may be readily removed and replaced by a new one.

A threaded collar 16 is riveted or otherwise secured to the head 5 and the interior threads of the collar 16 cooperate with a threaded portion 17 of the rod 9. The outer end of the rod 9 is provided with a handle 18 to facilitate the turning of the rod.

In the operation the device is inserted in the pipe or tube to be cleaned. The mesh 7 will engage the walls of the pipe or tube with sufficient friction to hold it when the handle 18 is turned to expand or bulge the mesh. As the dirt or other accretions are removed from the pipe the mesh 7 may be further expanded by turning the handle 18 and the cleaner worked back and forth until the interior of the tube or pipe is thoroughly cleaned.

The most important feature of the invention is the use of the mesh particularly illustrated and described and numerous changes might be made in the method of contracting the mesh longitudinally and causing it to bulge or expand circumferentially.

What I claim is:

A cleaning device comprising a plurality of strands of substantially heavy resilient wire formed into an open mesh cylindrically shaped and with the meshes being substantially identical, heads to which the ends of said strands of wire are secured, and means for moving said heads toward one another so that said meshes may be shortened axially and widened circumferentially, each of the strands of said mesh being continuous in a spiral line from one head to the other so as to allow freedom of movement of the strands in relation to each other and the strands of said mesh being of sufficient strength to cause said mesh to be substantially rigid and self-supporting.

In testimony whereof I affix my signature.

PHILIP J. MARTIN.